J. BEACH.
Cheese Hoop.
No. 10,956.  Patented May 23, 1854.
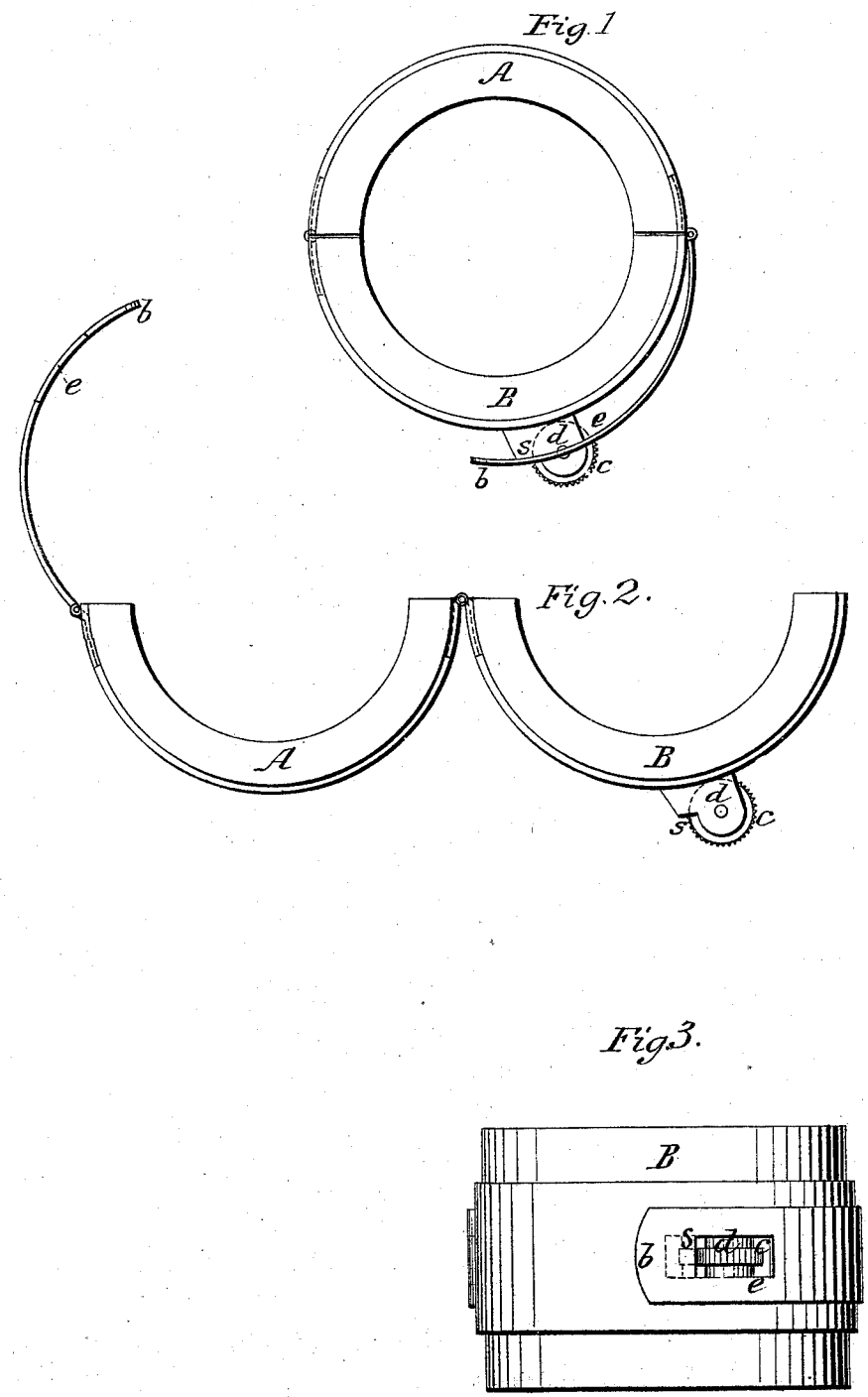

UNITED STATES PATENT OFFICE.

JOHN BEACH, OF DE RUYTER, NEW YORK.

CHEESE-HOOP.

Specification of Letters Patent No. 10,956, dated May 23, 1854.

*To all whom it may concern:*

Be it known that I, JOHN BEACH, of De Ruyter, in the county of Madison and State of New York, have invented a certain new and useful Improvement in Cheese-Hoops, of which the following is a full, clear, and exact description, reference being had to the accompanying drawing, which forms part of this specification, and in which—

Figure 1 represents a top view or plan of my improved cheese hoop closed; Fig. 2, a similar view of the hoop when open; and Fig. 3, a side or edge view thereof, when closed.

The ordinary cheese hoop or vat is in practice attended with many inconveniences and objections. Its solid ring form occasions much trouble and difficulty in getting the cheese in and out, and, of turning the cheese, which, from time to time, is requisite in order to insure perfect strainage during the process of pressing it, and, in making large or weighty cheeses, to turn the hoop, together with the cheese, much labor and difficulty is involved, by reason of the weight of the hoop or vat being added to that of the cheese. To remove these objections, I have long used a hoop made in two parts hinged together on the one side and clamped or united by a removable cotter at the other so that the hoop might be opened for the reception, removal and turning of the cheese, but the several fastenings which I have heretofore adopted for securing the hoop when closed have been in one or more respects, all of them, defective, either in point of durability, facility of operation, or non-liability to derangement, and the injury to which such fastenings have been exposed by strainage during the pressing of the cheese has in course of time rendered the fastening imperfect and caused the hoop to gap or fail in closing tight and this I find is especially the case with all of the well known spring fastenings which otherwise possess great advantages, such as facility and expedition in their use—advantages, that are of importance in cheese making and without which the ordinary solid or closed ring form of hoop will continue to be preferred as being more simple and less costly;—and, with the cotter fastenings I find that they occasion much trouble and inconvenience by occasionally sticking or being difficult to loosen by reason of the strain thrown upon them during the compression of the cheese and by the cotter rusting or getting bent.

To obviate these defects and provide a simple, expeditious and durable mode of fastening and unfastening the hoop is the object of my invention.

The cheese hoop represented in the accompanying drawing is made in halves (A and B) which are hinged together at their one end so as to admit of the said halves opening and closing for the reception and removal of the cheese and which are clasped together at their opposite end, when it is required to shut the hoop, by a hasp (*b*) hinged to one of the hoop pieces or halves near the mouth or open end and secured by a roller catch (*c*) to the other half of the hoop, as follows: The roller (*c*) is hung in a bracket (*d*) permanently fixed to the one hoop half at some distance from the mouth or opening end of it, and is of such diameter as to project beyond or outside of the bracket; this roller (*c*) should be of softer metal than the hasp (*b*) and should be milled or ribbed on its edge. The hasp (*b*) has a mortise or recess (*e*) in it for receiving the roller and projecting end of the bracket (*d*) through it and so that, when the hoop is closed and hasp shut, the front end or edge of the mortise (*e*) laps tightly over the roller on the one side of it; and the bracket (*d*) is made with a lip or shoulder (*s*) for the lip or front end of the hasp to bear against when closed, the position or projecting distance of the shoulder (*s*) being such as to form a bearing surface to the hasp when the front end or edge of the mortise (*e*) laps over that point in the periphery of the roller which is at the greatest distance from the hinge of the hasp and when the hasp laps over, or thereabout, the center of the roller as represented in Fig. 1.

By this construction and arrangement, the hoop may be opened or closed with the greatest facility and despatch, as, in shutting to the hasp, it will slightly spring to admit of the hasp being lapped with ease, but tightly, over the center of the roller, and, in opening the clasp, the roller (*c*) may be made to assist a pull, by the one hand, on the lip of the hasp, by turning the roller, with the thumb or fingers of the other hand, in a suitable direction to cause it to throw out or open the hasp by the action of the periphery of the roller against the front edge of the mortise, the milled surface of the periphery of the roller assisting materially both in the locking and opening of the hasp.

When closed, the hoop is restrained from all tendency to open by the pressure of the cheese on the interior during the pressing process, by the tight lap of the hasp over the roller as shown and described, for, the tendency of the hoop will, by the pressure exerted to press the one half of the hoop in one direction and the other half in an opposite direction, be exerted to cause the hasp to bear tighter against the roller and, by the pull of the hasp over the center of the roller,—to which position it is adjusted or arrested at, in closing, by the shoulder (s) of the bracket,—all tendency of the roller to turn and assist the opening of the clasp, during the pressing of the cheese within the hoop, is avoided; while the greatest durability is insured to this mode of fastening and the hoop always made to shut tight by simply turning the roller from time to time so as to vary the point or surface of it exposed to wear by the bite of the hasp, the wear being principally or wholly confined to the roller and the front edge of the mortise in the hasp being relieved from wear by reason of the hasp being made of somewhat harder metal than the roller. Thus, a simple, effective, durable and easy and expeditious mode of fastening and unfastening the hoop is obtained.

What I claim as my improvement in cheese hoops, and desire to secure by Letters Patent, is—

The method herein described of fastening and unfastening the hoop, by means of the roller (c) and hinged hasp (b) constructed, arranged and operating together and in combination with the hinged halves of the hoop, for the purposes herein set forth, as shown and described, and whereby great facility and expedition is insured in the operation of the clasp, the tightening action of the clasp made effective and durable, and the hoop restrained from springing or flying open when pressure is applied to the interior thereof, as specified.

In testimony whereof, I have hereunto subscribed my name.

JOHN BEACH.

Witnesses:
  A. V. BENTLEY,
  C. M. BENTLEY.